United States Patent [19]
Elia et al.

[11] Patent Number: 5,131,971
[45] Date of Patent: Jul. 21, 1992

[54] APPARATUS FOR MAKING A REINFORCED FABRIC FROM A RIBBON OF UNCURED ELASTOMERIC MATERIAL

[76] Inventors: Gerardo P. Elia, 804 Memorial Pakwy., Akron, Ohio 44303; Gaetan Arbour, 4781 St. Rose, Notre Dame de Lourdes, Joliette, Quebec, Canada, J0K 1K0; Ivan Z. Podobnik, 24 Terry Street, Barrie, Ontario, Canada, L4N 2G1

[21] Appl. No.: 640,777
[22] Filed: Jan. 14, 1991
[51] Int. Cl.⁵ ................................. B32B 31/18
[52] U.S. Cl. ..................... 156/512; 156/264; 156/266; 156/907; 83/276; 83/277
[58] Field of Search .......... 156/264, 266, 512, 907; 83/276, 277

[56] References Cited

U.S. PATENT DOCUMENTS

| | | | |
|---|---|---|---|
| 2,702,579 | 2/1955 | Perry | 156/907 |
| 2,962,083 | 11/1960 | Hasselquist | 83/152 |
| 3,077,803 | 2/1963 | Hasselquist | 83/158 |
| 3,649,416 | 3/1972 | Chapman et al. | 83/277 |
| 3,694,283 | 9/1972 | Cooper et al. | 156/907 |
| 3,803,965 | 4/1974 | Alderfer | 83/155 |
| 3,859,152 | 1/1975 | Brey et al. | 156/266 |
| 3,888,713 | 6/1975 | Alderfer | 156/93 |
| 3,942,230 | 3/1976 | Nalband | 29/132 |
| 4,010,664 | 3/1977 | Marshall | 83/277 |
| 4,025,384 | 5/1977 | Shiozaki et al. | 156/502 |
| 4,552,602 | 11/1985 | Landness | 156/266 |
| 4,682,928 | 7/1987 | Foulke et al. | |

*Primary Examiner*—Caleb Weston
*Attorney, Agent, or Firm*—Ernst H. Ruf

[57] ABSTRACT

A shuttle head which can be translated along a longitudinal axis between an assembly table and a lead-in table, wherein the shuttle head has a vacuum pick-up for picking up a ribbon of uncured elastomeric material. The shuttle head includes a pick-up plate having a plurality of apertures communicating with the source of vacuum. A cutting knife is provided on the edge of the assembly table for cutting the strip of ribbon, and the assembly table and cutting knife can be adjusted angularly with respect to the lead-in table. The pick-up plate has an inverted V-shaped edge at the leading end of the shuttle head immediately adjacent the cutting knife, such as to allow a variety of angular displacements of the assembly table relative to the lead-in table without having to change the pick-up plate.

8 Claims, 3 Drawing Sheets

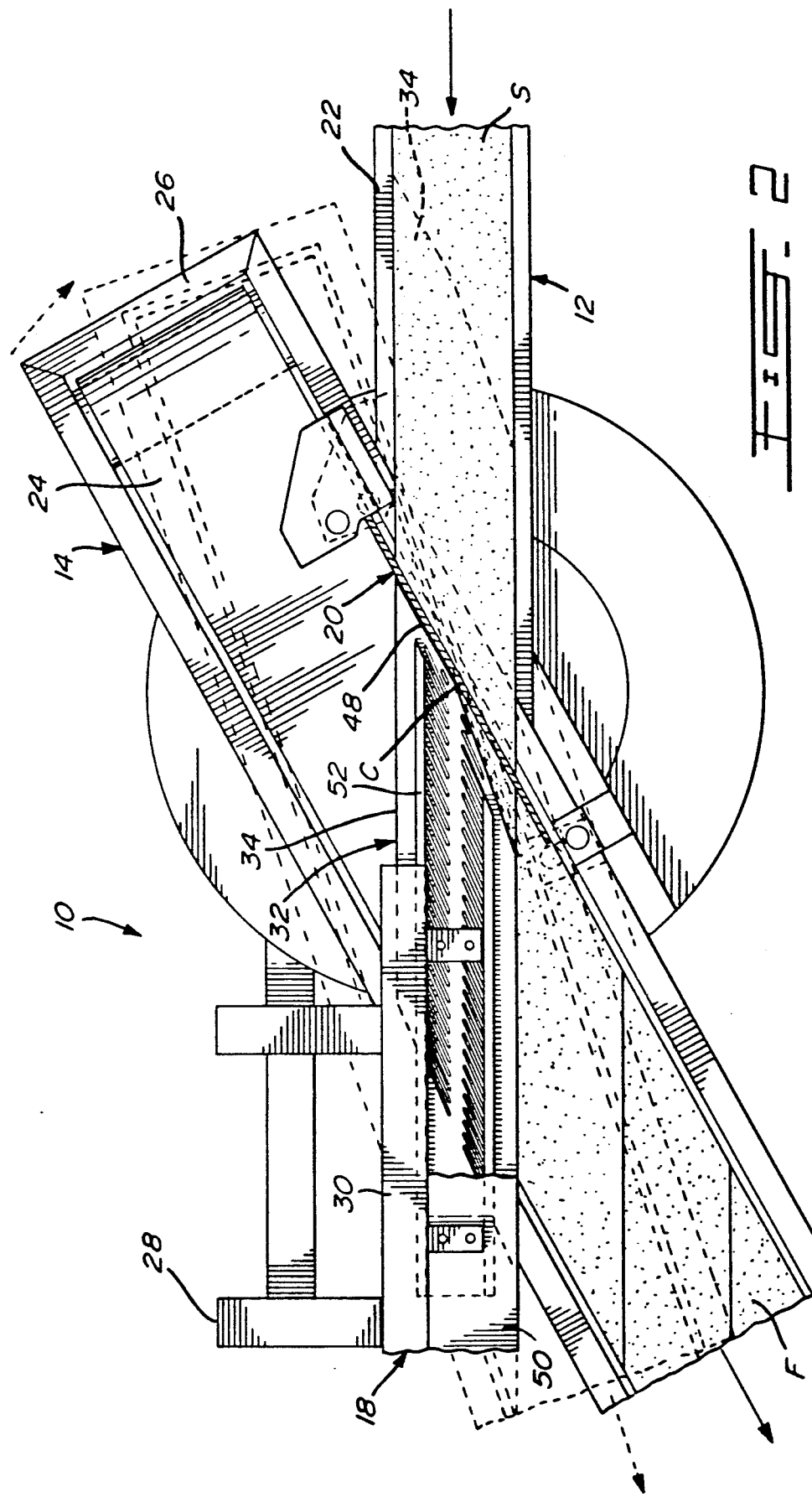

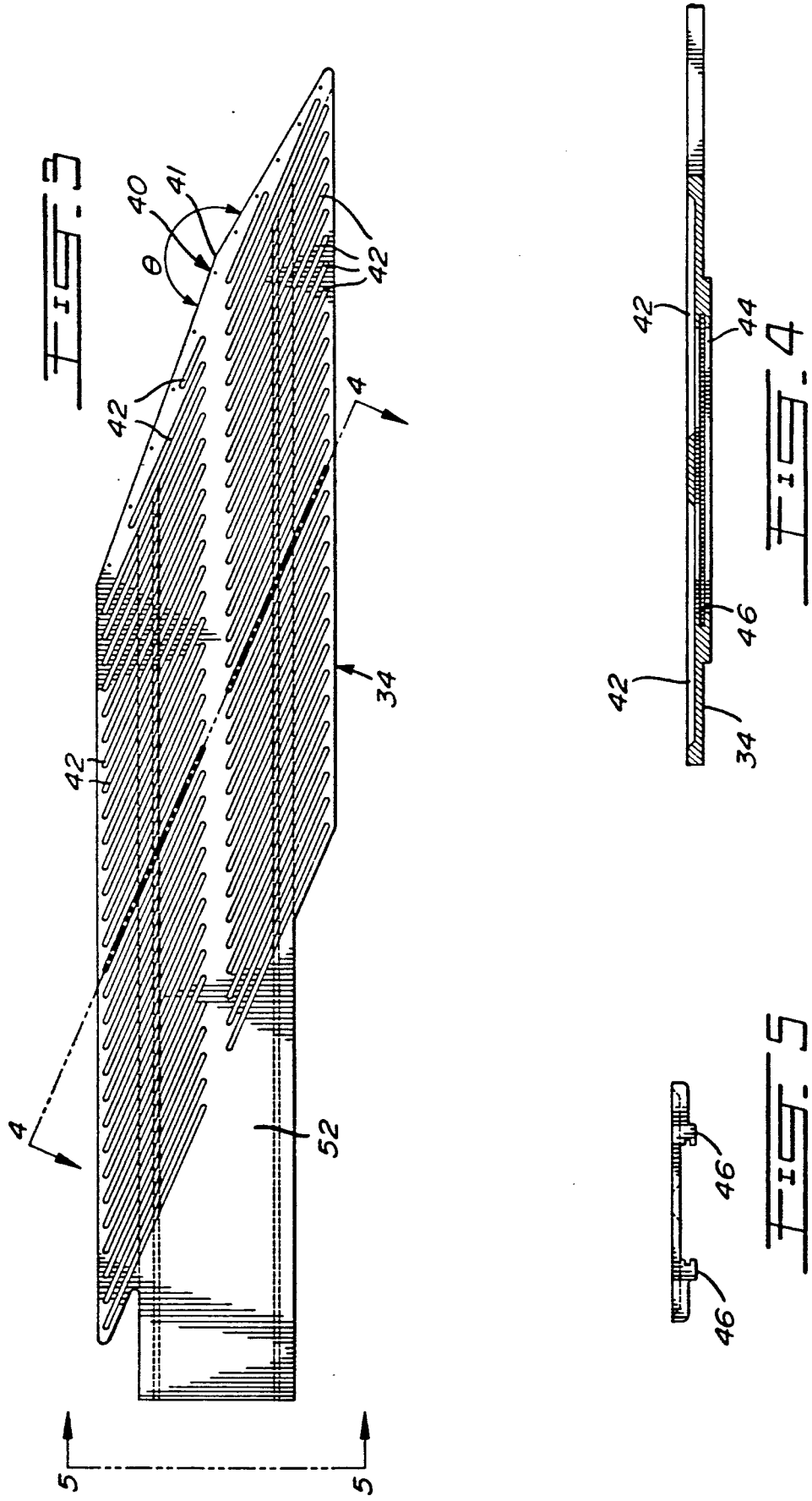

APPARATUS FOR MAKING A REINFORCED FABRIC FROM A RIBBON OF UNCURED ELASTOMERIC MATERIAL

BACKGROUND OF THE INVENTION

1. Field of the Invention

The present invention relates to tire building, and more particularly, to an improved apparatus for making a reinforced fabric from a ribbon of uncured elastomeric material in which a reinforcement is encapsulated.

2. Description of the Prior Art

U.S. Pat. No. 3,803,965, issued Apr. 16, 1974 to Alderfer, describes in some detail the apparatus and method for making reinforced fabric wherein a lead-in table and an assembly table are positioned at an angle to each other, and a shuttle head grips the ribbon of elastomeric reinforced material on the lead-in table and positions it on the assembly table at an angle to the longitudinal direction thereof. The assembly table is indexed to advance the fabric being formed at increments which allows the strips being deposited by the shuttle head to be overlapped along the edges thereof. A guillotine knife severs the strip as it is being deposited on the assembly table. The belt of fabric so formed has the reinforcement oriented at a preselected bias, and the angle between the lead-in table and the assembly table may be adjusted as a result of a prerequired bias.

The apparatus referred to above, and as described in U.S. Pat. No. 3,803,965, is representative of the state of the art and is widely used in the tire building industry. Whenever it is required to change the bias of the reinforcement in a tire, it is necessary to adjust the angle of the assembly table relative to the lead-in table and shuttle head. The guillotine is mounted to the assembly table to cut the strips so that the so-formed edges of the belt are parallel to the longitudinal axis thereof. Thus, the plane of the guillotine changes in angle relative to the shuttle head.

It has been found in practice that the pick-up plate of the shuttle head must be changed for each change in angle, since the leading edge of the pick-up plate terminates in close proximity to the guillotine blade and normally has an end edge adjacent and parallel to the plane of the guillotine.

The shuttle head defines a plenum, and a plurality of openings are provided in the pick-up plate to allow alternating negative and positive air pressure to be applied to the elastomeric strip. The face of the pick-up plate may be polished aluminum or Teflon (a trade mark of E. I. DuPont de Nemour & Co. for tetrafluoroethylene). However, it still manages to be coated with elastomeric material, such as uncured rubber, which must be cleaned at frequent occurrences.

SUMMARY OF THE INVENTION

It is an aim of the present invention to provide an improved shuttle head which overcomes the disadvantages mentioned above.

It is a further aim of the present invention to provide an improved shuttle head which can be utilized with a variety of angular variations between the lead-in table and the assembly table.

It is a further aim of the present invention to provide an improved shuttle head pick-up plate which has a surface which readily releases the uncured elastomeric material from the surface thereof.

It is a still further aim of the present invention to present a shuttle head which has an improved distribution of vacuum openings in order to have a better pick up and deposit of the elastomeric strip.

In a construction in accordance with the present invention, there is provided a lead-in table and an assembly table with a shuttle head having a leading end and a trailing end. Means to translate the shuttle head along a longitudinal axis between a first position over the assembly table and a second position over the lead-in table are provided, and the shuttle head includes a housing defining a plenum chamber and a pick-up plate having apertures in the plate communicating with the plenum chamber. The apertures are located to engage at least a portion of the ribbon received on the lead-in table. Means are also provided for selective communication between the plenum chamber and a source of subatmospheric pressure and selectively a source of at least atmospheric pressure. When the shuttle head is in the second position over the lead-in table, means are provided to have the shuttle head engage the ribbon on the lead-in table by application of the subatmospheric pressure, and then, when in a first position, the shuttle head accurately deposits a strip of ribbon on the assembly table. Cutting means are provided to sever the strip of predetermined length deposited on the assembly table, wherein the cutting means acts in a cutting plane adjacent the leading end of the shuttle head when the shuttle head is in the first position. The leading end of the shuttle head includes an inverted V-shaped edge defining an angle greater than 180° and does not exceed 197° in order that the shuttle head be used through a variety of bias angles of between 57° and 74° in the formation of fabric by changing the angular disposition of the lead-in table and the assembly table.

In a more specific embodiment of the present invention, the pick-up plate is coated with an anti-stick coating on the exterior surface thereof, wherein the coating is plasma flame sprayed and is a blend of fluorocarbon and a metal having a Rockwell hardness index of between 55 and 75.

An advantage of the shuttle head in accordance with the present invention is that since the leading edge of the shuttle head and the pick-up plate thereof are mounted for translation movement along a longitudinal axis aligned with the lead-in table and since the cutting knife is mounted to the assembly table structure, in view of the inverted V-shaped leading edge of the shuttle head, provisions are thus made to allow limited angular displacement of the assembly table relative to the lead-in table and, therefore, the shuttle head, while maintaining the leading edge of the shuttle head in close proximity to the cutting knife during the different angular adjustments of the assembly table.

BRIEF DESCRIPTION OF THE DRAWINGS

Having thus generally described the nature of the invention, reference will now be made to the accompanying drawings, showing by way of illustration, a preferred embodiment thereof, and in which:

FIG. 2 is an enlarged fragmentary top plan view of a detail shown in FIG. 1;

FIG. 3 is a plan view of an element in accordance with the present invention;

FIG. 4 is a vertical cross-section, taken along line 4—4 of FIG. 3; and

FIG. 5 is an end elevation of the detail shown in FIG. 3, taken along line 5—5 of FIG. 3.

DESCRIPTION OF THE PREFERRED EMBODIMENTS

Figure 1:
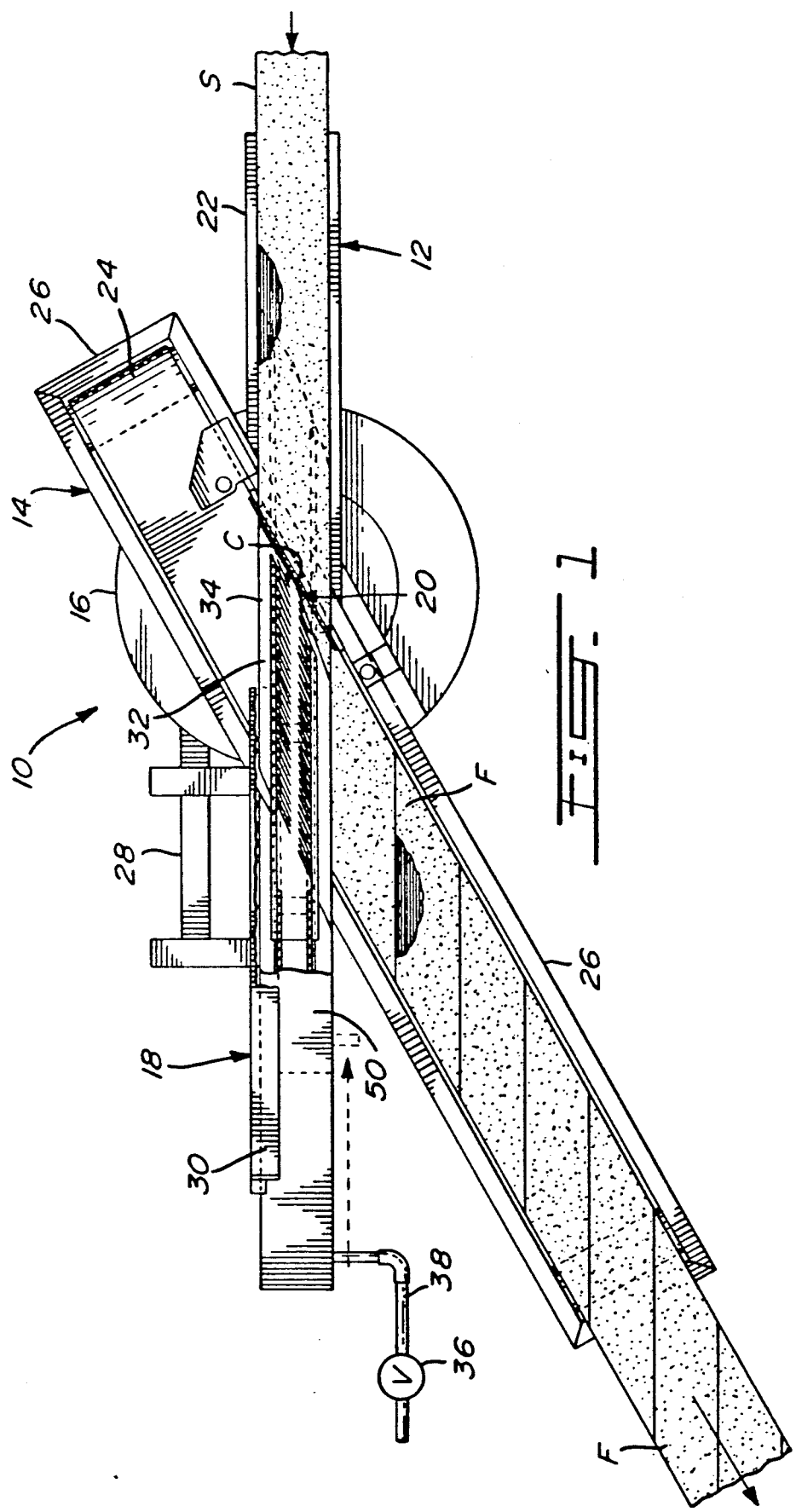
FIG. 1 is a top plan view of a typical lead-in table and assembly table arrangement for making a reinforced biased tire fabric and including the present invention.

Referring now to the drawings, there is shown a bias cutting apparatus 10 having a lead-in table 12 and an assembly table 14 mounted on a quadrant 16. The assembly table 14 can be rotated on the quadrant 16 through a range of angles relative to the lead-in table 12. A shuttle head assembly 18 is also shown in FIGS. 1 and 2, and a guillotine assembly 20 is illustrated, mounted to the assembly table 14.

The lead-in table 12 is supported on its frame which could be mounted to the base on which the quadrant and the assembly table are mounted. The center of rotation C of the assembly table 14 on the quadrant 16 intersects the longitudinal axis of the lead-in table and the shuttle head. Likewise, the plane of the guillotine blade 48 of the guillotine assembly 20 includes the center of rotation C of the assembly table and thus the center of the quadrant. The center of rotation C of the assembly table 14 is at an edge of the table 14.

The assembly table 14 is provided with a conveyor 24. Control means, which are well known, are provided for intermittently advancing the conveyor to thereby advance the fabric being formed.

The shuttle head 18 is illustrated schematically with a portion of the housing 50 cut away so as to see the pick-up plate 34 in its operative position. The shuttle head 18 is operated by means of a suitable reciprocating mechanism (not shown). The type of reciprocating mechanism is well described in U.S. Pat. No. 3,803,965 to Alderfer.

A conduit 38 is illustrated as communicating with the shuttle head housing 50 and thus with the plenum formed therein. A valve 36 is shown schematically in FIG. 1 to illustrate that control means are provided for alternating from a source of vacuum to a source of air pressure as will be described later. Thus, the shuttle head 18 will reciprocate in the longitudinal axis of the lead-in table by means of a reciprocating mechanism referred to above and which would be mounted on frame 28.

A guillotine 20 is represented in FIGS. 1 and 2 by a cross-section of the guillotine blade 48. The blade 48 is made to travel in a vertical plane to sever the strip S after a predetermined length has been advanced on to the assembly table 14 as will be described. The guillotine knife 48 travels in a plane which is substantially along the edge of the assembly table as shown in FIG. 2 and includes in the plane thereof the center of rotation C of the assembly table 14 on the quadrant 16.

The longitudinal axis of the shuttle head 18 and the lead-in table 12 intersects a vertical axis passing through this center C.

The shuttle head 18 includes a pick-up plate 34 as shown in FIGS. 3 through 5. The pick-up plate 34 includes a stem 52 and an enlarged portion in which a plurality of slots 42 are provided. The leading edge 40 of the pick-up plate 34 has the configuration of an inverted V with an apex 41 having an angle $\theta$ of 191° in the present embodiment. The width of the enlarged portion is approximately 6 inches across. Rails 46 are provided on the opposite surface of the pick-up plate 34 and are adapted to be engaged on tracks 52 in housing 50. As shown in FIG. 4, the slots 42 communicate with the plenum 44 defined with the housing 50. In the present embodiment, large areas of the pick-up plate are defined with parallel slots 42. In the present embodiment, two rows of slots are provided with each slot 42 close to an adjacent slot. Near the apex 41 formed by the V-shaped leading edge 40, shorter slots 42 are defined in order to ensure that almost the complete surface of the pick-up plate is provided with such vacuum slots. It is understood that the leading edge 40 may vary between an angle greater than 180° but less than 197°. A preferred angle would be 191° such that the apex 41 of the leading edge 40 is near the center line C of the assembly table and thus just adjacent the blade 48. The guillotine blade, on the assembly table 14, can thus be rotated through a range of 11° (in the latter case) about the center C with the apex 41 always near the center of rotation of the blade in either one of the diverging edge portions being in closer proximity to the blade depending on the angle of the blade.

The exterior surface of the pick-up plate 34 is coated with a non-stick coating. Examples of these non-stick coatings are PCI-915 which is a nickel-chrome and fluorocarbon mixture having a Rockwell hardness of 58. This is a coating which is applied by plasma flame spray and is conducted by Plasma Coatings, Inc. Another example of such plasma spray coating is PCI series 200, and in particular, PCI-272, which is a blend of tungsten carbide and a fluorocarbon. The tungsten carbide fluorocarbon coating has a Rockwell hardness up to 72. A typical coating suitable for the present invention is described in U.S Pat. No. 3,942,230, issued Mar. 9, 1976 to Nalband and assigned to Plasma Coatings, Inc.

Tests have shown that little or no adhesion of the otherwise soft uncured rubber sticks to the pick-up plate and, therefore, down time for maintaining and cleaning the plate is virtually eliminated.

In operation, as described in U.S. Pat. No. 3,803,965, the shuttle head is advanced from its first position above the assembly table to a second position, when the guillotine blade 48 is in its upper position, above the lead-in table. At this point, the shuttle head 18 can be lowered to contact the strip S or, as in U.S. Pat. No. 3,803,965, the lead-in table can be raised to meet the shuttle head 18.

In any event, when the pick-up plate 34 is in contact with the strip S, the control will turn on valve 36 to allow negative pressure in the plenum and thus the vacuum is applied through the slots to the top surface of the strip S. The shuttle head 18 is then returned to its first position above the assembly table 14, and it is lowered while the conveyor belt 24 advances a predetermined increment so that the newly presented length of strip can be lowered to overlap the previous strip of fabric F.

Normally the bias of the reinforcing elements in the fabric F can be anywhere between 59° and 70°. It is possible that a bias from 57° to 74° might be required. As described in U.S. Pat. No. 3,803,965, the assembly table mounted on the quadrant 16 can be rotated about center line C to a suitable angle relative to the lead-in table 12 to provide the required bias angle. Since the guillotine 20 is mounted to the assembly table and rotates with the assembly table about the center line C, the strip S can be severed at a different angle to maintain the parallelity of the edge of the strips F. Because of the configuration of the leading edge 40 of the pick-up blade 34, that is, with the apex 41 of the leading edge 40 being approximately at the center C, any angle about the center C can be accommodated to provide the bias range of between 57° and 74° when the angle of the inverted V-shaped edge 40 is 197°. Practically speaking, however, the angle of this leading edge will be 191° since the normal range of bias would be between 59° and 70°.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved shuttle head for picking up the ribbon of uncured elastomeric material is constructed and used, the characteristics of the improved shuttle head, and the advantageous, new and useful results obtained; the new and useful structures, devices, elements, arrangements, part, combination and method steps are set forth in the appended claims.

We claim:

1. In an apparatus for making reinforced fabric from a ribbon of uncured elastomeric material in which a reinforcement is encapsulated, including:
   (a) a lead-in table;
   (b) an assembly table means;
   (c) a shuttle head having a leading end and a trailing end;
   (d) means to translate said shuttle head along a longitudinal axis between a first position over said assembly table and a second position over said lead-in table;
   (e) the shuttle head comprising a housing defining a plenum chamber and a pick-up plate having an anti-stick exterior surface and apertures communicating with said plenum chamber, said apertures being located to engage at least a portion of the ribbon received on said lead-in table;
   (f) means to provide selective communication between the plenum chamber and a source of subatmospheric pressure and selectively, a source of at least atmospheric pressure;
   (g) means by which the shuttle head in the second position engages the ribbon on the lead-in table on application of said subatmospheric pressure and accurately depositing, in said first position, a strip of ribbon having a predetermined length on said assembly table means; and
   (h) cutting means to sever the strip of predetermined length deposited on said assembly table means from the ribbon, wherein said cutting means acts in a cutting plane adjacent the leading end of the shuttle head when the shuttle head is in the first position;
      wherein the leading end of the shuttle head includes an inverted V-shaped edge defining an angle greater than 180° and does not exceed 197° in order that the shuttle head be used through a variety of bias angles of between 57° and 74° in the formation of the fabric by changing the angular disposition of the lead-in table and the assembly table means.

2. An apparatus as defined in claim 1, wherein the pick-up plate is provided with a non-stick coating which is plasma fire sprayed made up of a blend of metal and fluorocarbon.

3. An apparatus as defined in claim 1, wherein the angle of the V-shaped edge is 191° and the apex of the V-shaped edge is adjacent the plane of the cutting means.

4. An apparatus as defined in claim 1, wherein the assembly table means is mounted for rotation about a vertical axis through the center of rotation at an edge of the assembly table means and the center of rotation passes through the plane of the cutting means and the longitudinal axis of the shuttle head passing through the apex of the inverted V-shaped edge intersects the cutting plane at the center of rotation.

5. An apparatus as defined in claim 4, wherein the apex of the V-shaped edge is adjacent the vertical axis through the center of rotation.

6. An apparatus as defined in claim 2, wherein the pick-up plate is provided with a plurality of slots with each slot communicating with the plenum, said slots being closely spaced together and parallel and extending over most of the area of the pick-up plate and slots are provided in the area of the pick-up plate encompassed by the inverted V-shaped edge.

7. An apparatus as defined in claim 2, wherein the plasma spray coating is a nickel chrome and fluorocarbon blend having a Rockwell hardness of 58.

8. An apparatus as defined in claim 2, wherein the plasma fire spray coating is a tungsten carbide and fluorocarbon blend with a Rockwell hardness of 72.

* * * * *